(12) United States Patent
Sterbling et al.

(10) Patent No.: US 11,316,947 B2
(45) Date of Patent: Apr. 26, 2022

(54) MULTI-LEVEL CACHE-MESH-SYSTEM FOR MULTI-TENANT SERVERLESS ENVIRONMENTS

(71) Applicant: INTERNATIONAL BUSINESS MACHINES CORPORATION, Armonk, NY (US)

(72) Inventors: Sven Sterbling, Tuebingen (DE); Christian Habermann, Boeblingen (DE); Sachin Lingadahalli Vittal, Mannheim (DE)

(73) Assignee: International Business Machines Corporation, Armonk, NY (US)

( * ) Notice: Subject to any disclaimer, the term of this patent is extended or adjusted under 35 U.S.C. 154(b) by 18 days.

(21) Appl. No.: 16/834,754

(22) Filed: Mar. 30, 2020

(65) Prior Publication Data

US 2021/0306438 A1    Sep. 30, 2021

(51) Int. Cl.
*G06F 15/16* (2006.01)
*H04L 67/5682* (2022.01)
(Continued)

(52) U.S. Cl.
CPC ............ *H04L 67/2852* (2013.01); *H04L 9/32* (2013.01); *H04L 67/1095* (2013.01); *H04L 67/1097* (2013.01); *H04L 67/327* (2013.01)

(58) Field of Classification Search
CPC ..... H04L 67/2852; H04L 67/327; H04L 9/32; H04L 67/1097; H04L 67/1095
(Continued)

(56) References Cited

U.S. PATENT DOCUMENTS

| 6,981,138 | B2 | 12/2005 | Douceur |
| 8,112,525 | B2 | 2/2012 | Langen |

(Continued)

FOREIGN PATENT DOCUMENTS

| CN | 108664324 A | 10/2018 |
| JP | 4117144 B2 | 7/2018 |

OTHER PUBLICATIONS

Boner, "How To Build Stateful, Cloud-Native Services With Akka and Kubernetes," Lightbend, 18 pages, https://www.lightbend.com/white-papers-and-reports/stateful-cloud-native-services-with-akkaand-kubernetes.

(Continued)

*Primary Examiner* — Karen C Tang
(74) *Attorney, Agent, or Firm* — Rakesh Roy

(57) ABSTRACT

A method, computer system, and a computer program product for execution of a stateless service on a node in a workload execution environment is provided. The present invention may include defining for each node a workload container including a cache component of a cache-mesh. The present invention may include, upon receiving a state request from a stateless requesting service from one of the cache components of the cache-mesh in an execution container, determining whether a requested state is present in the cache component of a related execution container. The present invention may include, upon a cache miss, broadcasting the state request to other cache components of the cache-mesh, determining, by the other cache components, whether the requested state is present in respective caches, and upon any cache component identifying the requested state, sending the requested state to the requesting service using a protocol for communication.

20 Claims, 7 Drawing Sheets

(51) Int. Cl.
*H04L 67/63* (2022.01)
*H04L 9/32* (2006.01)
*H04L 67/1095* (2022.01)
*H04L 67/1097* (2022.01)

(58) Field of Classification Search
USPC .................................................. 709/217, 231
See application file for complete search history.

(56) References Cited

U.S. PATENT DOCUMENTS

| | | | |
|---|---|---|---|
| 8,161,163 B2 | 4/2012 | Hunt | |
| 8,924,743 B2 | 12/2014 | Conte | |
| 9,292,443 B2 | 3/2016 | Alexander | |
| 10,362,092 B1* | 7/2019 | Parthasarathy | H04L 67/28 |
| 10,817,392 B1* | 10/2020 | McAuliffe | G06F 11/2023 |
| 2005/0108250 A1 | 5/2005 | Hunt | |
| 2006/0259703 A1* | 11/2006 | Sohm | G06F 11/3648 |
| | | | 711/122 |
| 2009/0019158 A1 | 1/2009 | Langen | |
| 2017/0091204 A1* | 3/2017 | Minwalla | H04L 43/04 |
| 2017/0149843 A1 | 5/2017 | Amulothu | |
| 2018/0302490 A1* | 10/2018 | Surcouf | H04L 67/02 |
| 2019/0364128 A1 | 11/2019 | Jang | |
| 2020/0019330 A1* | 1/2020 | Brandt | G06F 3/0641 |
| 2020/0019622 A1* | 1/2020 | Lu | G06F 9/5077 |
| 2020/0073704 A1 | 3/2020 | Abali | |
| 2020/0076685 A1* | 3/2020 | Vaidya | G06F 9/44526 |
| 2020/0128108 A1* | 4/2020 | Clark | H04L 67/14 |
| 2020/0280592 A1* | 9/2020 | Ithal | H04L 45/7453 |
| 2020/0314006 A1* | 10/2020 | Mackie | H04L 61/256 |

OTHER PUBLICATIONS

Cloud Functions Execution Environment, Cloud Functions Documentation, Google Cloud, https://cloud.google.com/functions/docs/concepts/exec, Aug. 21, 2019, pp. 1-11.

Mell et al., "The NIST Definition of Cloud Computing", National Institute of Standards and Technology, Special Publication 800-145, Sep. 2011, 7 pages.

* cited by examiner

400

402 Storage System For Storing Definitions For Each Of A Plurality Of Nodes At Least One Workload Container 404 Receiver Or Transceiver Component

MULTI-LEVEL CACHE-MESH-SYSTEM FOR MULTI-TENANT SERVERLESS ENVIRONMENTS

BACKGROUND

The present invention relates generally to the field of digital computer systems, and more specifically to a computer-implemented execution of a stateless service on a node in a workload environment.

RELATED ART

Modern computing environments, often deployed on cloud computing platforms and in cloud frameworks, are composed of a plurality of interacting services and/or micro-services. One of the characteristics of such micro-services is that they are often stateless, i.e., the state is not persistent from one invocation to a next one of the micro-service. However, in some instances it may be useful to make the state of the micro-services available for a next call of the micro-services. This is not only interesting as an underlying technology for transactional applications—e.g., technical e-commerce infrastructure—but also for the management of cloud computing frameworks and/or multi-processor systems in cloud computing environments. Such resources may be available from different provider organizations under different conditions, performance levels and service level agreements. However, if a resource management for such resources may also be based on an interaction of stateless services and/or micro-services, it may also be useful in such situations to access the "old" state of the respective service/micro-service.

Cloud providers typically provide the physical or virtual computing resources to which clients can subscribe and use resources of the service computing environment, whereas the cloud provider may manage the allocation and the underlying computing and network infrastructure. This operation model is advantageous for the client, as he can optimize operational costs. On the other hand, the cloud provider's legitimate interest is to minimize operational and investment costs for the business model to be feasible. Therefore, the cloud provider typically limits the computer resource allocation, wherein the limitation is normally supported by a specific programming methodology. The underlying programming model is thus a stateless, event driven, processing time limited serverless model.

While being advantageous for specific execution requirements, this model has also some disadvantages. Obviously, one disadvantage is that it is stateless, i.e., data or state information cannot easily be shared from one execution cycle to the next execution cycle of a function or between different functions or services.

There are several disclosures related to a method for an execution of a stateless service on a node in a workload execution environment.

Document U.S. Pat. No. 8,112,525 B2 discloses a session initiation protocol (SIP) server comprising an engine tier and state tier distributed on a cluster network environment. The engine tier can send, receive and process various messages. The state tier can maintain in-memory state data associated with various SIP sessions. A near cache can reside on the engine tier in order to maintain a local copy of a portion of the state data contained in the state tier. Various engines in the engine tier can determine whether the near cache contains a current version of the state needed to process a message before retrieving the state data from the state tier.

Document U.S. Pat. No. 8,161,163 B2 discloses a stateless distributed computer architecture allowing state-caching objects, which hold server state information, to be maintained in a client or network rather than on a server. In one implementation, the computer architecture implements object-oriented program modules according to a distributed component object model (DCOM). Using an object-oriented network protocol (e.g., remote procedure call), a client-side application call through an application program interface, a program object residing at a server computer. The program object, responsive to the call, creates a state caching object that contains state information pertaining to the client connection. The server inserts the state-caching object into a local threat context and processes the request to generate a reply.

However, a disadvantage of known solutions may be that they often focus on maintaining the state via a persistent storage in the workload execution environment. Thus, there may be a need to provide a more dynamic state management in a flexible workload execution environment for stateless software containers.

SUMMARY

Embodiments of the present invention disclose a method, computer system, and a computer program product for execution of a stateless service on a node in a workload environment. The present invention may include defining at least one workload container for a respective node of a plurality of nodes, wherein the at least one workload container includes a cache component of a cache-mesh, wherein the cache-mesh includes a plurality of cache components, wherein the plurality of cache components includes a protocol for communication between each other.

According to one aspect, the present invention may include, in response to receiving a state request from a stateless requesting service from one of the plurality of cache components of the cache-mesh in an execution container, determining whether a requested state associated with the state request is present in the cache component of a related execution container.

According to one aspect, the present invention may include, in response to a cache miss, broadcasting the state request to other cache components of the plurality of cache components of the cache-mesh.

According to one aspect, the present invention may include, determining, by the other cache components of the plurality of cache components of the cache-mesh, whether the requested state is present in respective caches of the other cache components.

According to one aspect, the present invention may include, in response to any cache component identifying the requested state, sending the requested state to the requesting service using the protocol for communication.

According to another aspect of the present invention, a related cache-mesh system for an execution of a stateless service on a node in a workload execution environment may be provided. The workload execution environment may comprise a plurality of nodes. The cache-mesh system may comprise a storage adapted for storing definitions for each of a plurality of nodes at least one workload container comprising a cache component which is a portion of a cache-mesh. The cache components of the cache-mesh may use a protocol for a communication between each other.

The cache-mesh system may also comprise: receiving means adapted for: upon receiving a state request from a stateless requesting service from one of the cache components of the cache-mesh in an execution container determining whether the requested state is present in the cache component of the related execution container; and upon a cache miss, broadcasting the state request to cache components of the cache-mesh, determining, by the other cache components of the cache-mesh, whether the requested state is present in the respective caches, and upon any cache component identifying the requested state, sending the requested state to the requesting service using the protocol.

The proposed computer-implemented method for an execution of a stateless service on a node in a workload environment may offer multiple advantages, technical effects, contributions and/or improvements:

It may overcome the limitations of prior art, in particular through its ability to also function securely in a multi-tenant environment, which may be achieved by tier encryption of the communication protocols between the cache-mesh components. Additionally, the here proposed concept overcomes the missing isolation between different pods by way of using so-called sidecar containers in form of the cache-mesh components. The existing, original sidecar concept and Kubernetes has been designed as not being multi-tenant enabled.

Thus, the proposed concept may be enabled to exchange content between level-1 (L1) caches of stateless services. Thereby, a pool of L1 cache services may be denoted as cache-mesh. Furthermore, the here proposed concept may be enriched by a multi-layer cache setup to exchange common states between the cache-mesh components. For that purpose, the cache-mesh is the pool of caching services, in particular for services with workloads of similar type, e.g., using the same execution language or being executed in the same execution environment of the workload container, e.g., Java, node.js, Python, etc.

Hence, the here proposed concept may rely on the sidecar components next to the actual workload execution environments that maintain the cache-mesh implementation. To setup the cache-mesh, the protocol used may be enhanced with the notion of workload types. Thereby, workload types may define similar workloads based on their execution pattern (e.g., runtime engine, tenant information, and/or other metadata). The workload execution engine may interact with the cache-mesh sidecar on a pull and push based model. To ensure a consistent second level cache, the centralized caching component (L2) may be used to share the state between workloads of different types. Therefore, the L1 cache-mesh states may be transformed into a unified format that is stored in the centralized caching component (L2). Finally, a global scheduler component is introduced that may ensure proper routing of user workloads based on a secure encryption key, also across different clusters in different locations.

Finally, in a traditional multi-tenant serverless environment, the executing code and the scheduled node for execution have no correlation. Same nodes may not be used for the execution of the same function. But all the nodes that are up may save some state in its cache. By creating a mesh of sidecars, the cached state may be shared among the different cache-mesh components.

In the following, additional embodiments of the inventive concept, applicable to the method as well as to the related system—will be described.

According to one useful embodiment of the method, the protocol for communication may be encrypted. Accordingly, the security of the cache-to-cache communication may not be compromised. Hence, the provided workload execution environment may also be suited to comply with security standards. Users may use it without security concerns.

According to an advantageous embodiment, the method may also comprise upon or in response to completion of an execution of the execution container on the node, broadcasting an end state to the cache-mesh. Hence, any other nodes requiring the state of the execution container in which execution has ended may be informed. No additional communication protocol may be needed.

According to another advantageous embodiment, the method may also comprise providing a first centralized cache component for the plurality of nodes. This may be viewed as a level-2 cache for the nodes (and workload containers, e.g., the pods) which may store the received data, e.g., the state information, persistently.

According to another advantageous embodiment, the method may also comprise: upon determining that the requested state is not available in any of the cache components of the cache-mesh, loading the requested state from the first centralized cache component. This may represent a situation with a permanent cache miss. Hence, the data—e.g., the previous state—may be loaded from the first centralized cache storage, e.g., functioning as the level-2 cache.

According to one permissive embodiment of the method, the protocol for communication may include a component selected from the group consisting of an identifier of a user, a key identifying a cached value, and the cached value (e.g., via a cache identifier). In addition, other parameters—e.g., for the specific workload execution environment may enhance the exchanged protocol data.

According to another permissive embodiment, the method may also comprise: in response to completion of the execution of the execution container on the respective node, broadcasting the end state to the first centralized cache component. This state sending may be performed in parallel to the state sending to other members (e.g., cache components) of the cache-mesh. Hence, the last state of the execution container may be saved persistently anyway. It may also be used by the same service (e.g., a new instance) after a re-instantiation of the service (e.g., workload container).

According to one enhanced embodiment of the method, the cache components of the cache-mesh include a pool of cache components having a comparable workload type. The comparable workload type may include an execution pattern selected from the group consisting of an identical runtime engine (e.g., Java, or node.js), a user information (e.g., a user ID), and an identical programming language. In some embodiments, other metadata may also define comparable workload types. This may also be definable depending on the used workload execution environment.

According to one extended embodiment, the method may also comprise synchronizing a second centralized cache component with the first centralized cache component using a replication protocol. In one embodiment, the second centralized cache component may be maintained in a second remote workload execution environment. Hence, the proposed concepts would not only work in a local computing environment (e.g., one single datacenter) but would also work across data centers and even across countries and across continents. Thus, a worldwide usage of the proposed concepts in globally acting cloud computing providers may be enabled.

Furthermore, embodiments may take the form of a related computer program product, accessible from a computer-usable or computer-readable medium providing program code for use, by, or in connection, with a computer or any instruction execution system. For the purpose of this description, a computer-usable or computer-readable medium may be any apparatus that may contain means for storing, communicating, propagating, or transporting the program for use, by, or in connection, with the instruction execution system, apparatus, or device.

BRIEF DESCRIPTION OF THE SEVERAL VIEWS OF THE DRAWINGS

It should be noted that embodiments of the invention are described with reference to different subject-matters. In particular, some embodiments are described with reference to method type claims, whereas other embodiments are described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

The aspects defined above, and further aspects of the present invention, are apparent from the examples of embodiments to be described hereinafter and are explained with reference to the examples of embodiments, but to which the invention is not limited.

Figure 1:
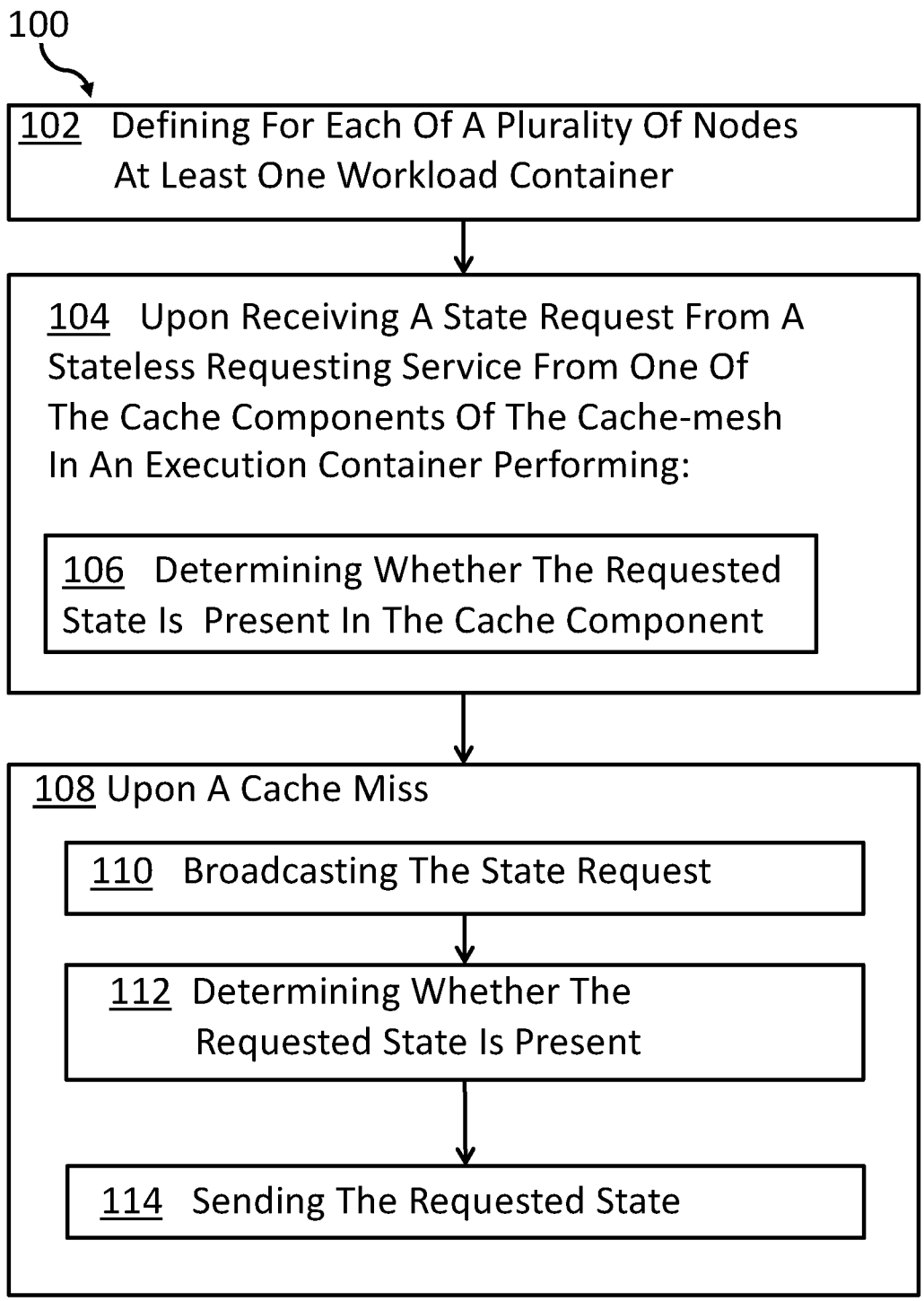
Figure 2:
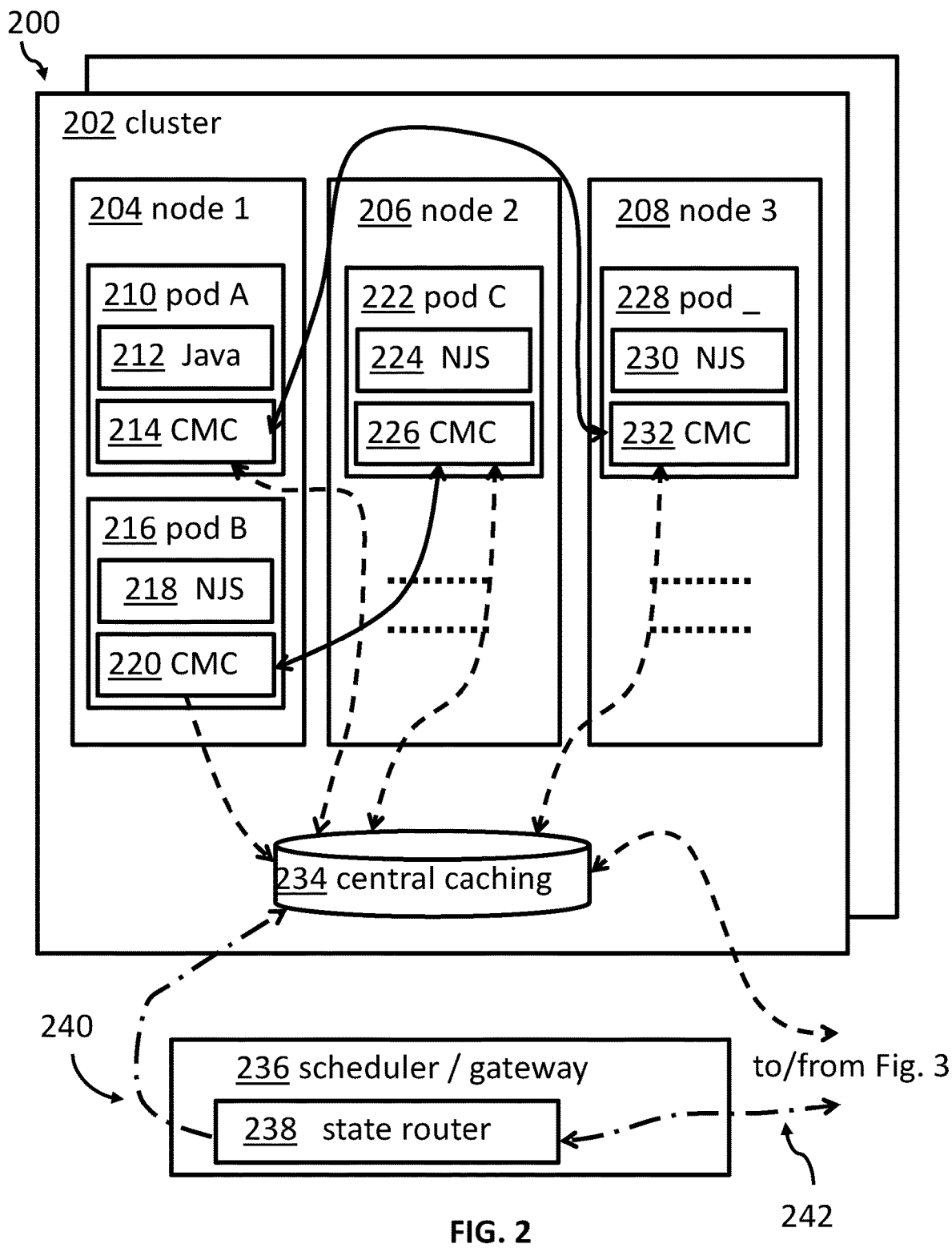
Figure 3:
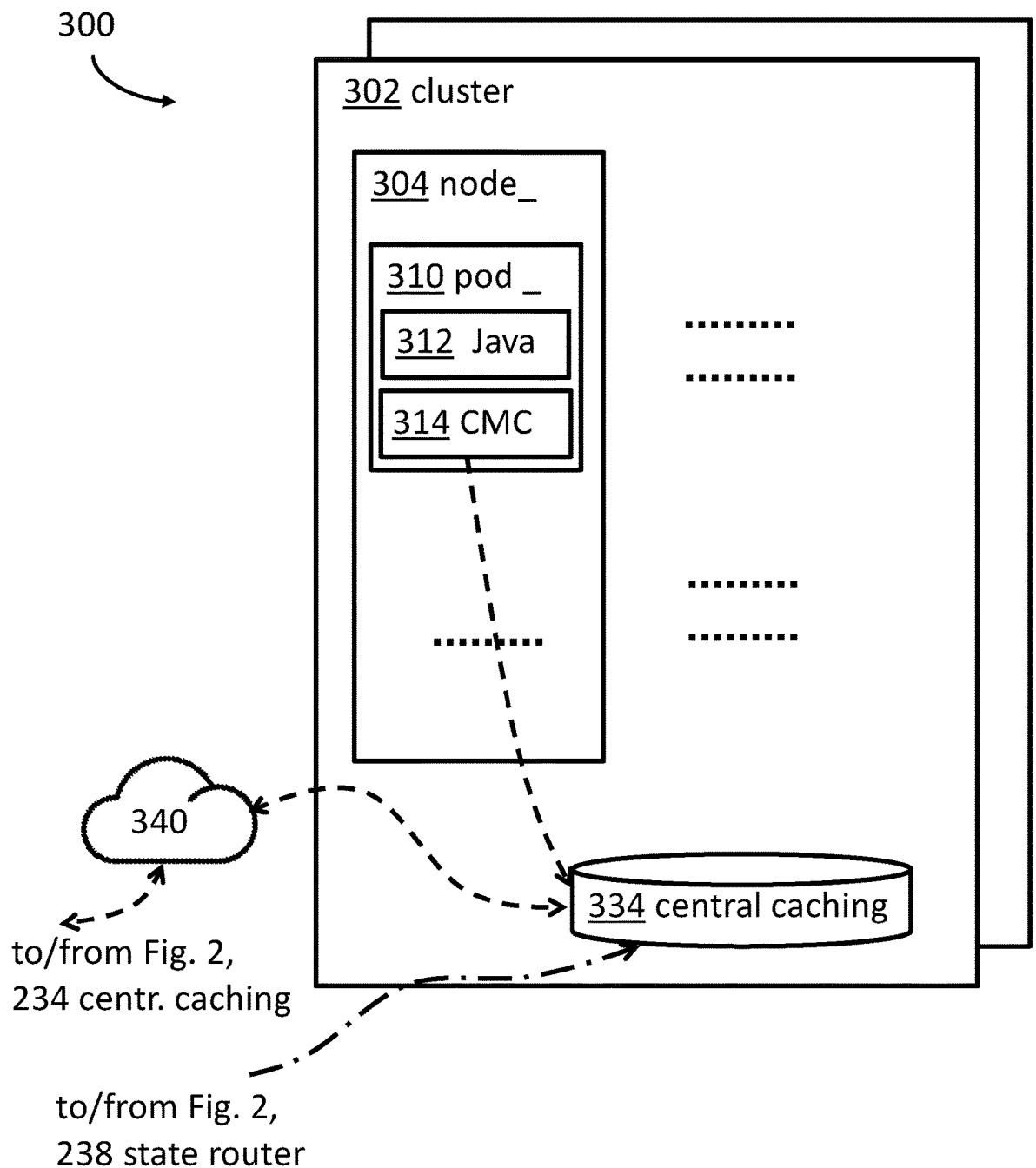
Figure 4:
Figure 4:
Figure 5:
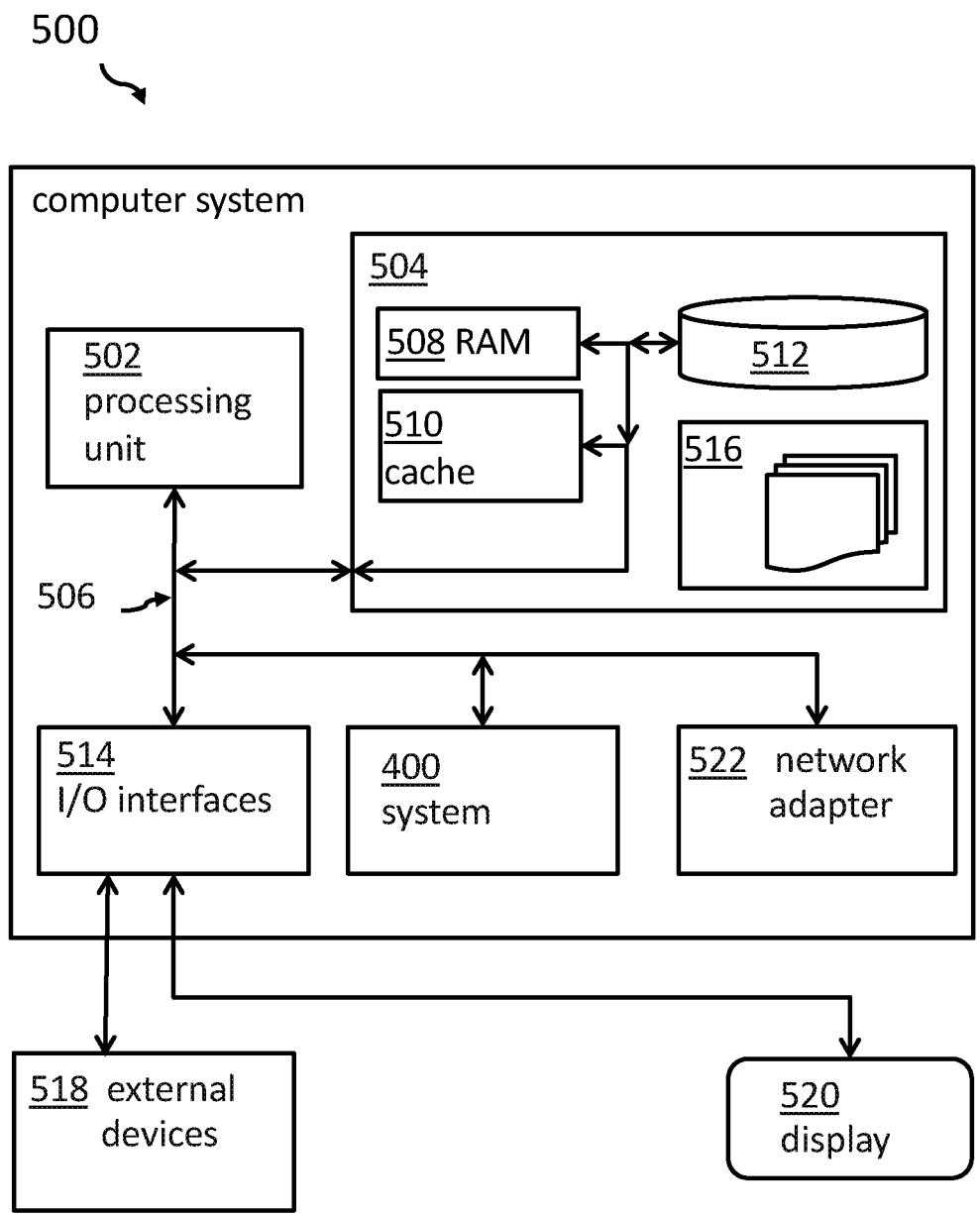
Figure 6:
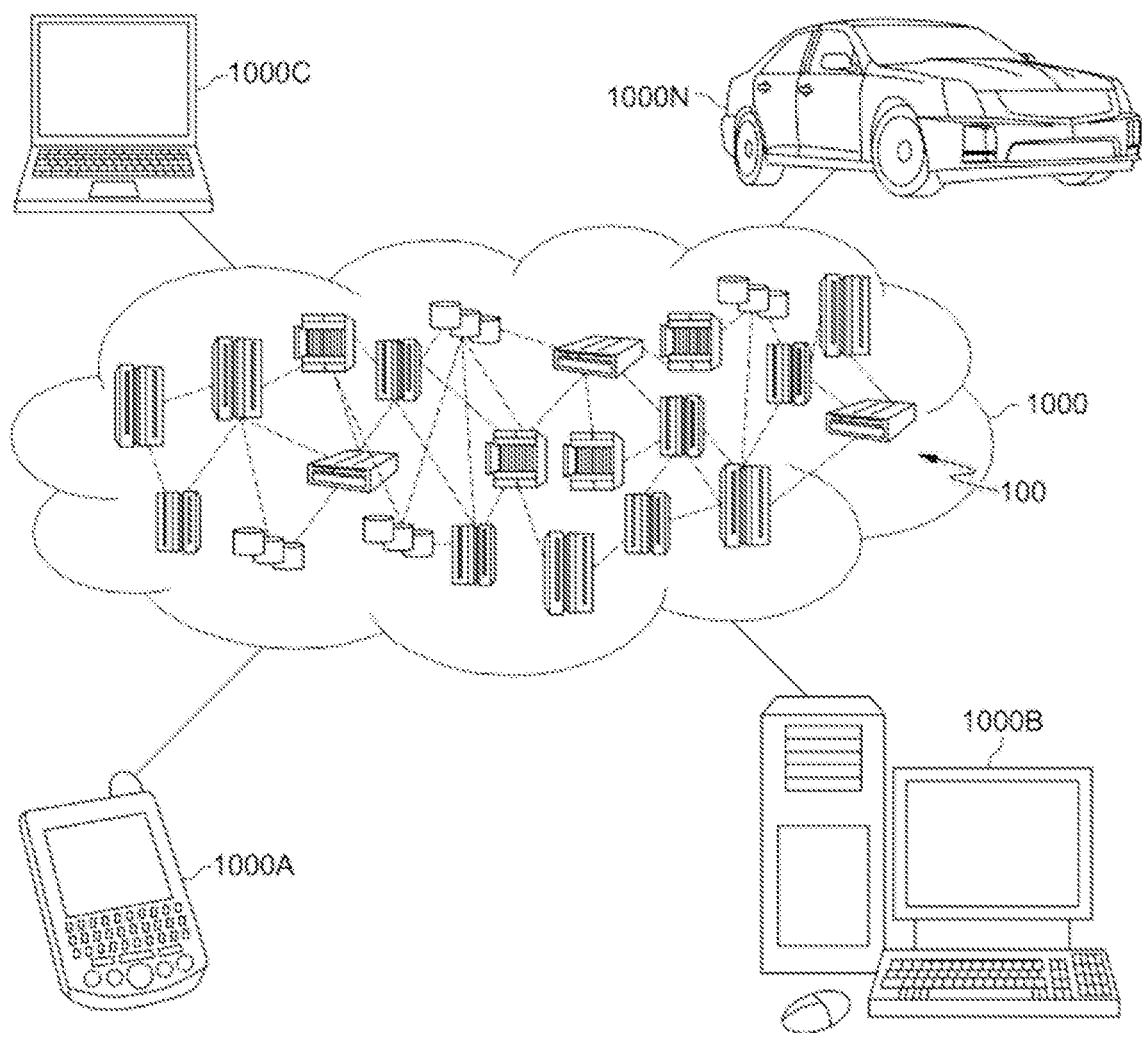
Figure 7:
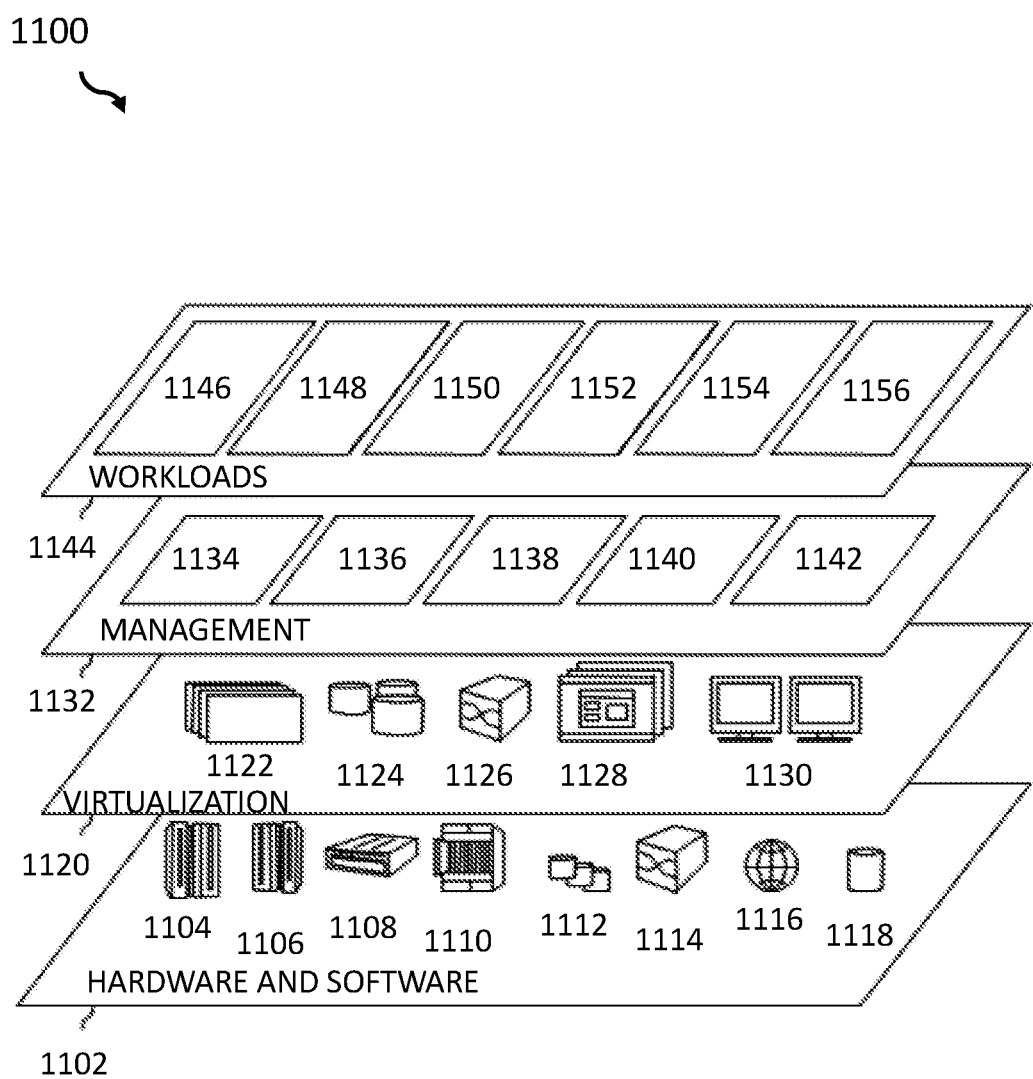

Preferred embodiments of the invention will be described, by way of example only, and with reference to the following drawings:

FIG. 1 is an operational flowchart illustrating a process for an execution of a stateless service on a node in a workload environment according to at least one embodiment;

FIG. 2 is a block diagram of an execution environment with several nodes according to at least one embodiment;

FIG. 3 is a block diagram of an extension of the execution environment at a remote location according to at least one embodiment;

FIG. 4 is a block diagram of a cache-mesh system for an execution of a stateless service on a node in a workload environment according to at least one embodiment;

FIG. 5 is a block diagram of internal and external components of a computer system comprising the cache-mesh system of FIG. 4 according to at least one embodiment;

FIG. 6 is a block diagram of an illustrative cloud computing environment including the computer system depicted in FIG. 5, in accordance with an embodiment of the present disclosure; and FIG. 7 is a block diagram of functional layers of the illustrative cloud computing environment of FIG. 6, in accordance with an embodiment of the present disclosure.

DETAILED DESCRIPTION

In the context of this description, the following conventions, terms and/or expressions may be used:

According to at least one embodiment of the disclosure, the term "stateless service" may denote a computing function based on the design principle that is applied within the service-orientation design paradigm in order to design scalable services by separating them from the state data whenever possible. The interaction of any two software programs may involve keeping track of interaction-specific data because subsequent interactions may depend upon the outcome of the previous interaction between the two software programs. However, in stateless computing environments, the state of the software program is not maintained after its execution has ended. Transfer of states may need to use other mechanisms.

According to at least one embodiment of the disclosure, the term "node" may denote a physical computing machine or a virtual machine depending on the used cluster. Each node may be managed by a master component. Single functions or services may be implemented as workload containers, workload execution containers or, in case of Kubernetes as the workload execution environment, as so-called pods.

According to at least one embodiment of the disclosure, the term "workload execution environment" may denote programming framework allowing a definition of clusters, nodes as well as workload containers, e.g., pods within the nodes to file on specific services. Examples of workload execution environments are Marathon for Apache Mesos® (Apache Mesos and all Apache-based trademarks and logos are trademarks or registered trademarks of The Apache Software Foundation and/or its affiliates), Docker® Swarm (Docker and all Docker-based trademarks and logos are trademarks or registered trademarks of Docker, Inc. and/or its affiliates), CoreOS® (CoreOS and all CoreOS-based trademarks and logos are trademarks or registered trademarks of CoreOS, Inc. and/or its affiliates), Red Hat Openshift® (Red Hat Openshift and all Red Hat-based trademarks and logos are trademarks or registered trademarks of Red Hat, Inc. and/or its affiliates), and Kubernetes® (Kubernetes and all Kubernetes-based trademarks and logos are trademarks or registered trademarks of The Linux Foundation and/or its affiliates).

According to at least one embodiment of the disclosure, the term "workload container" may denote the smallest self-contained unit enabled to deliver a service or microservice within the workload execution environment. In various embodiments, the term "workload execution container" may be used.

According to at least one embodiment of the disclosure, the term "cache component" may denote a specific component within a workload container used as local memory for the workload container. The related memory to the cache component may store a state of the workload container or service. However, once the workload container ends its execution, the data within the cache component and the related memory may vanish. Thus, in traditional workload execution environments, state information of the workload containers and within the cache components may not be persistent. Embodiments of the present disclosure may overcome this limitation.

According to at least one embodiment of the disclosure, the term "cache-mesh" may denote a loosely coupled network of cache components across different nodes in a cluster being enabled to exchange state data across, e.g., across the nodes and across workload containers within the same node.

According to at least one embodiment of the disclosure, the term "cache miss" may denote the inability of a service to access state data required in its cache memory.

According to at least one embodiment of the disclosure, the term "protocol for a communication between each other" may denote a communication protocol for exchanging messages and data between the cache components within a cluster. According to an extended version of the proposed concept the protocol for a communication between the cache components may also work across clusters in different geographical areas. The protocol may use encrypted messages.

According to at least one embodiment of the disclosure, the term "state request" may denote a request from one cache component to any other cache component in a cluster (or across clusters). The state request may be sent out in a broadcast form. A receiving cache component being able to deliver a requested state may return the requested state to the requesting cache component.

According to at least one embodiment of the disclosure, the term "centralized cache component" may denote a persistent storage within a cluster adapted to store state information of different execution containers in different nodes persistently. Thus, instead of exchanging state data between different cache components of different workload containers, the state information may also be requested from the first centralized cache component. The proposed concept relates to a first centralized cache component and a second centralized cache component. They only relate to each other in the sense that content of the first centralized cache components may be made available to the remote cluster and the other centralized cache component, (and vice versa). Both centralized cache components may be synchronized via a predefined protocol using a state router.

According to at least one embodiment of the disclosure, the term "remote workload execution environment" may denote a second cluster in a remote location viewed from the perspective of the initial workload execution environment.

According to at least one embodiment of the disclosure, the terms "cloud computing" and "cloud service environment" may in this context be interpreted as a model for enabling convenient, on-demand network access to a shared pool of configurable computing resources (e.g., networks, servers, storage, applications, and services) that can be rapidly provisioned and released with minimal management effort or service provider interaction. This cloud model promotes availability and is composed of at least five essential characteristics, three service models and four deployment models.

Essential characteristics of cloud computing comprise:
(i) On-demand self-service. A consumer can unilaterally provision computing capabilities, such as server time and network storage, as needed automatically without requiring human interaction with each service provider.
(ii) Broad network access. Capabilities are available over the network and accessed through standard mechanisms that promote use by heterogeneous thin or thick client platforms (e.g., mobile phones, laptops, and PDAs).
(iii) Resource pooling. The provider's computing resources are pooled to serve multiple consumers using a multi-tenant model with different physical and virtual resources, dynamically assigned and reassigned according to consumer demand. There is a sense of location independence in that the customer generally has no control or knowledge over the exact location of the provided resources, but may be able to specify location at a higher level of abstraction (e.g., country, state, or datacenter). Examples of resources include storage, processing, memory, network bandwidth and virtual machines.
(iv) Rapid elasticity. Capabilities can be rapidly and elastically provisioned, in some cases automatically, to quickly scale out and rapidly release to quickly scale in. To the consumer, the capabilities available for provisioning often appear to be unlimited and can be purchased in any quantity at any time.
(v) Measured Service. Cloud systems automatically control and optimize resource use by leveraging a metering capability at some level of abstraction appropriate to the type of service (e.g., storage, processing, bandwidth, and active user accounts). Resource usage can be monitored, controlled and reported providing transparency for both, the provider and consumer of the utilized service.

Service models for cloud Computing used comprise:
(i) Cloud Software as a Service (SaaS). The capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.
(ii) Cloud Platform as a Service (PaaS). The capability provided to the consumer is to deploy onto the cloud infrastructure consumer-created or acquired applications created using programming languages and tools supported by the provider. The consumer does not manage or control the underlying cloud infrastructure including network, servers, operating systems, or storage, but has control over the deployed applications and possibly applications hosting environment configurations.
(iii) Cloud Infrastructure as a Service (IaaS). The capability provided to the consumer is to provision processing, storage, networks, and other fundamental computing resources where the consumer is able to deploy and run arbitrary software, which can include operating systems and applications. The consumer does not manage or control the underlying cloud infrastructure, but has control over operating systems, storage, deployed applications, and possibly limited control of selected networking components (e.g., host firewalls).

Deployment models for cloud computing comprise:
(i) Private cloud. The cloud infrastructure is operated solely by an organization. It may be managed by the organization or a third party and may exist on premise or off premise.
(ii) Community cloud. The cloud infrastructure is shared by several organizations and supports a specific community that has shared concerns (e.g., mission, security requirements, policy, and compliance considerations). It may be managed by the organizations or a third party and may exist on premise or off premise.
(iii) Public cloud. The cloud infrastructure is made available to the general public or a large industry group and is owned by an organization selling cloud services.
(iv) Hybrid cloud. The cloud infrastructure is a composition of two or more clouds (private, community, or public) that remain unique entities but are bound together by standardized or proprietary technology that enables data and application portability (e.g., cloud bursting for load-balancing between clouds).

It may be noted that cloud software takes full advantage of the cloud paradigm by being service-oriented with a focus on statelessness (with exceptions), low coupling, modularity, and semantic interoperability.

In the following, a detailed description of the figures will be given. All instructions in the figures are schematic. Firstly, a block diagram of an embodiment of the computer-implemented method for an execution of a stateless service on a node in a workload environment is given. Afterwards, further embodiments, as well as embodiments of the cache-mesh system for an execution of a stateless service on a node in a workload execution environment, will be described.

Referring now to FIG. 1, an operational flowchart illustrating an exemplary embodiment of a computer-implemented process 100 for an execution—in particular, an accelerated execution—of a stateless service (e.g., an application) on a node in a workload execution environment. A primary target for the workload execution environment may be Kubernetes. However, the concept may also be compatible with other comparable workload execution environments, like Marathon for Apache Mesos, Docker Swarm, CoreOS, and Red Hat Openshift.

At 102, the process 100 includes defining, for each of a plurality of nodes at least one workload container. According to one embodiment, the workload execution environment may include a plurality of nodes. At least one workload container—e.g., in Kubernetes one pod—comprising (at least) a cache component, may be defined for each of the plurality of nodes. In one embodiment, the cache component may be a portion of the cache-mesh. As discussed, the cache may act as a level-1 cache. The workload container may also comprise a runtime environment like, e.g., Java runtime, node.js runtime, etc.

In one embodiment, the cache components of the cache-mesh may not be fully connected. Accordingly, the cache components may implement a protocol for a communication between each other. The general principle of communication may be performed via broadcasting to caches of workload container with the same or similar execution pattern. This may limit the scope of the broadcasting and thus support a high performance environment.

At 104, the process 100 includes upon receiving a state request from a stateless requesting service from one of the cache components of the cache-mesh in an execution container (e.g., in a pod) performing at 106: determining whether the requested state is present in the cache component of the related execution container—in particular related to the stateless requesting service.

At 108, the process 100 includes upon a cache miss, broadcasting at 110, the state request to cache components of the cache-mesh with similar execution patterns. The process 100 may also include determining at 112, by the other cache components of the cache-mesh, whether the requested state is present in the respective caches, and upon any cache component identifying the requested state, sending at 114, the requested state (e.g., sending it back) to the requesting service using the protocol. It may also be noted that the nodes may be implemented as other devices or as virtual machines.

The process 100 may be illustrated using the following example in which a user may want to setup an e-commerce site based around serverless functions with state handling.

The shopping cart is an example that requires state information. So, if a customer adds an item to his cart, a serverless function would be triggered by the e-commerce stateless application that injects his encryption key. The scheduler component would identify the customer and inform the L2 cache (e.g., the central cache component) to be prepared for a potential cache miss. Furthermore, the request would be scheduled to a workload execution engine of the determined function type (e.g., in this case it may be a node.js environment). If the function is now scheduled and executed, it would try to access the current state of the shopping cart based on the cache-mesh protocol.

Referring now to FIG. 2, a block diagram 200 of an execution environment with several nodes in an implementation-near form in accordance with one embodiment is depicted. The one or more clusters 202 may include a plurality of nodes 204, 206, 208 (e.g., node 1, node 2, node 3). Each of the nodes may include one or more pods 210, 216, 222, 228 (e.g., pod A, pod B, pod C, pod J, representing the workload containers. Each of the workload containers (e.g., pods) may include a cache component (also referred to as a cache-mesh component (CMC)) 214, 220, 226, 232, respectively. Each of the pods 210, 216, 222, 228 may also include a runtime environment 212, 218, 224, 230 (e.g., Java runtime engine (Java), node.js (NJS), Python engine). Each of the cache-mesh components 214, 220, 206, 232 may receive a state request from one of the other cache components of the cache mesh. If the cache component is not present in the related execution container, a broadcast message is sent out and received by other members of the cache-mesh. Preferably, only those cache-mesh components are addressed that have a related or comparable workload time as the requesting cache mesh component. This may be controlled by the type of protocol.

If the requested cache component has been identified in any of the other cache-mesh components addressed, the requested state is sent back to the requesting service using the underlying communication cache-mesh protocol. If the workload execution environment is Kubernetes, the cache mesh components may be implemented as, for example, "sidecars".

If, however, the state component is not found in any of the other cache-mesh components in the different pods in the cluster 202, the requested state may be requested from a central caching component 334 which is enabled to store the states of the pods 210, 216, 222, 228 persistently. This may be a fallback solution; however, the execution time for accessing the central caching component 234 for the plurality of nodes 204, 206, 208 in the cluster 202 may take longer than the proposed direct communication between cache-mesh components 214, 222, 226, 232 for state requests. As examples, an arrow between the cache-mesh component 214 and the cache-mesh component 232 indicates such a direct communication between two cache mesh components. Also, the double arrow and related line between the cache-mesh components 220 and 226 indicates such a direct state exchange using the cache-mesh protocol.

As also indicated by the dotted lines between the central caching component 234 and the cache-mesh components 214, 220, 226, 232, the central caching component 234 may include a central cluster-oriented persistent storage of the states of the different pods 210, 216, 222, 208.

Additionally, a scheduler/gateway 236 may control the scheduling of an execution invocation of the local execution environments 212, 218, 224, 230. It may also be enabled to receive an encryption key—e.g., from a user or another control process—for a secure protocol management of the cache-mesh components.

According to one embodiment, the scheduler/gateway 236 may include a state router 238 which may be adapted to synchronize state information between different clusters 202 and 302 (e.g., compare FIG. 3).

Aligned with the example given above (the shopping cart), the scenario may be expanded as follows: the user sends a REST request for an execution of a snippet in the workload execution environment. With each request, based on the user's identity and request type, the cache-mesh sidecar service, loads the previously stored state (if it exists) to its L1 cache and creates a cache-mesh if it does not exist (the protocol is described further down).

On the node, where execution is going to take place, the cache-mesh component decides to load the previously existing state to the corresponding L1 cache. The size of the L1 cache is limited, hence, the content of L1 cache is broadcasted to the other cache-mesh components and also loaded back to L2 cache (i.e., the centralized cache component 234)

after the execution is completed. The cache-mesh components behave as controlled by the protocol, described next:

The cache-mesh components are a pool of caching services, each acting as sidecar to the related execution node. The mesh can be formed based on: 1. the host node execution environment (e.g., nodes with same or comparable execution environments); 2. by the nodes that may be used by a single application for execution.

Upon arrival of a user request, the cache-mesh sidecar component validates whether the previous state is present in its cache. Upon a cache-miss, the cache-mesh sidecar component requests the cached state from the other cache-mesh components (by a broadcast message). The requesting cache-mesh sidecar component may thus broadcast the identity of the user and the request type in the cache-mesh.

Any other cache-mesh sidecar component in the mesh, after validating the user and request type upon cache-hit, may send the cached state to the requesting cache-mesh sidecar component. If the state is not present in the cache-mesh (e.g., in the other cache-mesh components), it loads the state from L2 cache. Upon a cache-miss in L2 cache, there is no cached content and/or state.

Once the execution on the node is complete, the end-state is broadcasted within the cache-mesh. Accordingly, if the next execution request arrives from the same user and any other node in the mesh is scheduled, the cache-mesh component may have the state previously loaded in its L1 cache. The L1 cache size is limited and the content is stored based on the underlying FIFO (first-in-first-out) protocol.

To ensure a proper level of security, with each request, one can send an encryption key which can be used to encrypt/decrypt the content of the respective cache-mesh component.

Referring now to FIG. 3, a block diagram 300 of an extension of the execution environment at a remote location according to at least one embodiment is depicted. The two clusters 302 and 202 (e.g., compare FIG. 2) may be connected via a public network, e.g., the Internet. Also cluster 302 may include a plurality of nodes (e.g., "node_"), of which only node 304 is shown. Also here, a plurality of workload execution containers 310 (e.g., a plurality of pods "pod_") may each include an execution environment (e.g., 312 Java) and related cache-mesh components 314. Additionally, cluster 302 may include a central caching component 334 which may be in communicative contact with the cache-mesh component 314 of the pod 310 of the node 304 of the cluster 302. Also here, the states of the different workload execution containers/pods 310 may be stored in the central caching component 334.

Symbol 340 may represent the public network (e.g., the Internet) from which a dashed line arrow may refer to the central caching component 234 of FIG. 2. This link may be used for a replication of status information between the central caching component 234 and the remote central caching component 334. This process may be controlled by the state router 238 of FIG. 2, indicated by the two dashed arrows 240, 242.

Referring now to FIG. 4, a cache-mesh system 400 for an execution of a stateless service on a node in a workload environment according to at least one embodiment is depicted. In one embodiment, the workload execution environment may include a plurality of nodes (not shown). The cache-mesh system 400 may store (e.g., in a storage system 402) definitions for each of a plurality of nodes, where the definitions indicate at least one workload container (for each of a plurality of nodes). In one embodiment, the workload container may include a cache component of a cache-mesh. The cache components of the cache-mesh may use a protocol for communication between each other.

The cache-mesh system 400 may include receiving component (e.g., a receiver or transceiver component 404) configured to: upon receiving a state request from a stateless requesting service from one of the cache components of the cache-mesh in an execution container, determining whether the requested state is present in the cache component of the related execution container, and upon a cache miss, broadcasting the state request to cache components of the cache-mesh, determining, by the other cache components of the cache-mesh, whether the requested state is present in the respective caches, and upon any cache component identifying the requested state, sending the requested state to the requesting service using the protocol. As mentioned above, the protocol may be encrypted for better security.

Referring now to FIG. 5, a computing system 500 suitable for executing program code related to embodiments of the present disclosure is depicted. Embodiments may be implemented together with virtually any type of computer, regardless of the platform being suitable for storing and/or executing program code.

The computing system 500 is only one example of a suitable computer system, and is not intended to suggest any limitation as to the scope of use or functionality of embodiments of the invention described herein, regardless, whether the computer system 500 is capable of being implemented and/or performing any of the functionality set forth hereinabove. In the computer system 500, there are components, which are operational with numerous other general purpose or special purpose computing system environments or configurations. Examples of well-known computing systems, environments, and/or configurations that may be suitable for use with computer system/server 500 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 500 may be described in the general context of computer system-executable instructions, such as program modules, being executed by a computer system 500. Generally, program modules may include routines, programs, objects, components, logic, data structures, and so on that perform particular tasks or implement particular abstract data types. Computer system/server 500 may be practiced in distributed cloud computing environments where tasks are performed by remote processing devices that are linked through a communications network. In a distributed cloud computing environment, program modules may be located in both, local and remote computer system storage media, including memory storage devices.

As shown in the figure, computer system/server 500 is shown in the form of a general-purpose computing device. The components of computer system/server 500 may include, but are not limited to, one or more processors or processing units 502, a system memory 504, and a bus 506 that couple various system components including system memory 504 to the processor 502. Bus 506 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 500 typically includes a variety of computer system readable media. Such media may be any available media that is accessible by computer system/server 500, and it includes both, volatile and non-volatile media, removable and non-removable media.

The system memory 504 may include computer system readable media in the form of volatile memory, such as random access memory (RAM) 508 and/or cache memory 510. Computer system/server 500 may further include other removable/non-removable, volatile/non-volatile computer system storage media. By way of example only, a storage system 512 may be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media may be provided. In such instances, each can be connected to bus 506 by one or more data media interfaces. As will be further depicted and described below, memory 504 may include at least one program product having a set (e.g., at least one) of program modules that are configured to carry out the functions of embodiments of the invention.

The program/utility, having a set (at least one) of program modules 516, may be stored in memory 504 by way of example, and not limiting, as well as an operating system, one or more application programs, other program modules, and program data. Each of the operating systems, one or more application programs, other program modules, and program data or some combination thereof, may include an implementation of a networking environment. Program modules 516 generally carry out the functions and/or methodologies of embodiments of the invention, as described herein.

The computer system/server 500 may also communicate with one or more external devices 518 such as a keyboard, a pointing device, a display 520, etc.; one or more devices that enable a user to interact with computer system/server 500; and/or any devices (e.g., network card, modem, etc.) that enable computer system/server 500 to communicate with one or more other computing devices. Such communication can occur via Input/Output (I/O) interfaces 514. Still yet, computer system/server 500 may communicate with one or more networks such as a local area network (LAN), a general wide area network (WAN), and/or a public network (e.g., the Internet) via network adapter 522. As depicted, network adapter 522 may communicate with the other components of the computer system/server 500 via bus 506. It should be understood that, although not shown, other hardware and/or software components could be used in conjunction with computer system/server 500. Examples, include, but are not limited to: microcode, device drivers, redundant processing units, external disk drive arrays, RAID systems, tape drives, and data archival storage systems, etc.

Additionally, the cache-mesh system 400 for an execution of a stateless service on a node in a workload execution environment may be attached to the bus system 506.

Referring now to FIG. 6, an illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 6 are intended to be illustrative only and that computing nodes 100 and cloud computing environment 1000 can communicate with any type of computerized device over any type of network and/or network addressable connection (e.g., using a web browser).

Referring now to FIG. 7, a set of functional abstraction layers 1100 provided by cloud computing environment 1000 is shown. It should be understood in advance that the components, layers, and functions shown in FIG. 7 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and the cache-mesh system 1156 (compare FIG. 4, 400).

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer readable storage medium (or media) having computer readable program instructions thereon for causing a processor to carry out aspects of the present invention.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the invention. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

What is claimed is:

1. A computer-implemented method, comprising:
    defining at least one workload container for a respective node of a plurality of nodes, wherein the at least one workload container includes a cache component of a cache-mesh, wherein the cache component includes a local memory for the at least one workload container, wherein the cache-mesh includes a plurality of cache components across different nodes of the plurality of nodes, wherein the plurality of cache components includes a protocol for communication between each other;
    in response to receiving a state request from a stateless requesting service from one of the plurality of cache components of the cache-mesh in an execution container, determining whether a requested state associated with the state request is present in the cache component of a related execution container;
    in response to a cache miss, broadcasting the state request to other cache components of the plurality of cache components of the cache-mesh;
    determining, by the other cache components of the plurality of cache components of the cache-mesh, whether the requested state is present in respective caches of the other cache components; and
    in response to any cache component identifying the requested state, sending the requested state to the requesting service using the protocol for communication.

2. The method of claim 1, wherein the protocol for communication is encrypted.

3. The method of claim 1, further comprising:
    in response to completion of an execution of the execution container on the respective node, broadcasting an end state to the cache-mesh.

4. The method of claim 1, further comprising:
    providing a first centralized cache component for the plurality of nodes.

5. The method of claim 4, further comprising:
    in response to determining that the requested state is not available in the plurality of cache components of the cache-mesh, loading the requested state from the first centralized cache component.

6. The method of claim 1, wherein the protocol for communication includes a component selected from the group consisting of an identifier of a user, a key identifying a cached value, and the cached value.

7. The method of claim 4, further comprising:
    in response to completion of the execution of the execution container on the respective node, broadcasting the end state to the first centralized cache component.

8. The method of claim 1, wherein the plurality of cache components of the cache-mesh include a pool of cache components having a comparable workload type.

9. The method of claim 8, wherein the comparable workload type includes an execution pattern selected from the group consisting of an identical runtime engine, a user information, and an identical programming language.

10. The method of claim 4, further comprising:
    synchronizing a second centralized cache component with the first centralized cache component using a replication protocol, wherein the second centralized cache component is maintained in a second remote workload execution environment.

11. A computer system for execution of a stateless service on a node in a workload execution environment, comprising:
    one or more processors, one or more computer-readable memories, one or more computer-readable tangible storage media, and program instructions stored on at least one of the one or more computer-readable tangible storage media for execution by at least one of the one or more processors via at least one of the one or more memories, wherein the computer system is capable of performing a method comprising:
    defining at least one workload container for a respective node of a plurality of nodes, wherein the at least one workload container includes a cache component of a cache-mesh, wherein the cache component includes a local memory for the at least one workload container, wherein the cache-mesh includes a plurality of cache components across different nodes of the plurality of nodes, wherein the plurality of cache components includes a protocol for communication between each other;
    in response to receiving a state request from a stateless requesting service from one of the plurality of cache components of the cache-mesh in an execution container, determining whether a requested state associated with the state request is present in the cache component of a related execution container;

in response to a cache miss, broadcasting the state request to other cache components of the plurality of cache components of the cache-mesh;

determining, by the other cache components of the plurality of cache components of the cache-mesh, whether the requested state is present in respective caches of the other cache components; and in response to any cache component identifying the requested state, sending the requested state to the requesting service using the protocol for communication.

12. The system of claim 11, further comprising:
in response to completion of an execution of the execution container on the respective node, broadcasting an end state to the cache-mesh.

13. The system of claim 11, further comprising:
providing a first centralized cache component for the plurality of nodes.

14. The system of claim 13, further comprising:
in response to determining that the requested state is not available in the plurality of cache components of the cache-mesh, loading the requested state from the first centralized cache component.

15. The system of claim 11, wherein the protocol for communication includes a component selected from the group consisting of an identifier of a user, a key identifying a cached value, and the cached value.

16. The system of claim 13, further comprising:
in response to completion of the execution of the execution container on the respective node, sending the end state to the first centralized cache component.

17. The system of claim 11, wherein the plurality of cache components of the cache-mesh include a pool of cache components having a comparable workload type.

18. The system of claim 11, wherein the comparable workload type includes an execution pattern selected from the group consisting of an identical runtime engine, a user information, and an identical programming language.

19. The system of claim 13, further comprising:
synchronizing a second centralized cache component with the first centralized cache component using a replication protocol, wherein the second centralized cache component is maintained in a second remote workload execution environment.

20. A computer program product for execution of a stateless service on a node in a workload execution environment, the computer program product comprising:

one or more computer-readable storage media and program instructions collectively stored on the one or more computer-readable storage media, the program instructions comprising:

program instructions to define at least one workload container for a respective node of a plurality of nodes, wherein the at least one workload container includes a cache component of a cache-mesh, wherein the cache component includes a local memory for the at least one workload container, wherein the cache-mesh includes a plurality of cache components across different nodes of the plurality of nodes, wherein the plurality of cache components includes a protocol for communication between each other;

program instructions to in response to receiving a state request from a stateless requesting service from one of the plurality of cache components of the cache-mesh in an execution container, determine whether a requested state associated with the state request is present in the cache component of a related execution container;

program instructions to in response to a cache miss, broadcast the state request to other cache components of the plurality of cache components of the cache-mesh;

program instructions to determine, by the other cache components of the plurality of cache components of the cache-mesh, whether the requested state is present in respective caches of the other cache components; and program instructions to in response to any cache component identifying the requested state, send the requested state to the requesting service using the protocol for communication.

* * * * *